United States Patent [19]

Kriegner et al.

[11] 4,411,534
[45] Oct. 25, 1983

[54] METHOD OF CONTINUOUSLY MEASURING THE TEMPERATURE OF THE SURFACE OF A CONTINUOUSLY CAST STRAND OVER ITS LENGTH

[75] Inventors: Othmar Kriegner, St. Valentin; Günther Gruber, Linz, both of Austria

[73] Assignee: Voest-Alpine Aktiengesellschaft, Linz, Austria

[21] Appl. No.: 222,017

[22] Filed: Jan. 2, 1981

[30] Foreign Application Priority Data

Jan. 11, 1980 [AT] Austria ................................. 131/80

[51] Int. Cl.³ ...................... G01K 13/06; G01K 7/08
[52] U.S. Cl. .................................. 374/141; 136/233; 164/1; 164/154; 374/153
[58] Field of Search .............. 73/351, 341; 136/230; 364/472; 164/449; 374/153, 183, 179, 142, 141

[56] References Cited

U.S. PATENT DOCUMENTS

| | | | |
|---|---|---|---|
| 2,991,654 | 7/1961 | Engelhard | 73/351 X |
| 3,279,956 | 10/1966 | Ekstrom, Jr. | 73/351 X |
| 3,324,724 | 6/1967 | Essers et al. | 73/351 X |
| 3,331,247 | 7/1967 | Toepell | 73/351 |
| 3,787,667 | 1/1974 | King et al. | 364/472 |
| 3,810,507 | 5/1974 | Schoffmann et al. | 164/260 |
| 4,051,270 | 9/1977 | Butler | 73/351 X |
| 4,118,986 | 10/1978 | Werner et al. | 73/351 |
| 4,150,715 | 4/1979 | Kagerhuber et al. | 164/448 |
| 4,269,260 | 5/1981 | Engel et al. | 164/442 |
| 4,274,273 | 6/1981 | Fapiano et al. | 364/472 |

FOREIGN PATENT DOCUMENTS

| | | | |
|---|---|---|---|
| 2206721 | 2/1972 | Fed. Rep. of Germany | 164/260 |
| 2657068 | 6/1978 | Fed. Rep. of Germany | 374/179 |
| 2242172 | 3/1975 | France | 164/260 |

OTHER PUBLICATIONS

Publ. (Encyclopedia Britannica), vol. 11, 1966, pp. 252-254.
Publ. (Iron and Steel Engineer.), "Design and Construction: A Modern Continuous Casting Installation", 8/1972, pp. 25-35.
Publ. (Lexikon Der Feinwerktechnik), vol. 14, Deutsche Verlags Anstalt Stuttgart, 1969, p. 503, (point 2).

*Primary Examiner*—Daniel M. Yasich
*Attorney, Agent, or Firm*—Brumbaugh, Graves, Donohue & Raymond

[57] ABSTRACT

In a method of continuously measuring the temperature of the surface of a strand over the length of a continuously cast strand within a roller guide of a continuous casting plant, at least one thermoelement with its measuring junction and the thermocouple connecting the measuring junction with equalizing conduits are applied onto the strand surface and moved together with the strand surface. In order to make the method insensitive to the conditions prevailing within the cooling chamber, for example, the presence of a high level of humidity or steam, and to keep free the space laterally of the strand by providing a measuring arrangement for carrying out the method which is designable in a constructionally simple manner, the thermoelement is rolled into the strand surface in the longitudinal direction of the strand.

4 Claims, 2 Drawing Figures

METHOD OF CONTINUOUSLY MEASURING THE TEMPERATURE OF THE SURFACE OF A CONTINUOUSLY CAST STRAND OVER ITS LENGTH

BACKGROUND OF THE INVENTION

The invention relates to a method of continuously measuring the temperature of the surface of a strand over the length of a continuously cast strand, in particular a cast strand for steel slabs, within a roller guide of a continuous casting plant, wherein at least one thermoelement with its measuring junction and the thermocouple connecting the measuring junction with equalizing conduits are applied onto the strand surface and moved together with the strand surface.

It is known to use partial-radiation or two-color pyrometers in combination with sight tubes or light conductors for measuring the temperature of the strand surface. In this case, the pyrometer is arranged outside the cooling chamber of the continuous casting plant, a sight tube extending from the pyrometer to almost the surface of the strand. Since there is always steam within the cooling chamber, it is necessary, for keeping free the tube, to blow air in through the sight tube prior to and during measuring. This air, however, causes a cooling of the strand surface at the measuring point and thus a falsification of the measured result. With arcuate continuous casting plants, pyrometers that are arranged on the lower side of the strand, i.e., on the outer side of the arc, are particularly jeopardized by the penetration of water into the sight tube, a breakdown of the pyrometers often occurring after only a short measuring period. When using light conductors no cooling of the measuring point occurs, yet light conductors have only a low temperature resistance (up to about 240° C.), and can be used only in limited lengths. Therefore, it is necessary to arrange the pyrometer in this case within the cooling chamber, which, however, constitutes quite a considerable risk to the functioning ability of the pyrometer.

When using a pyrometer, there is another disadvantage that the surface temperature of the strand can be measured on certain spots of the strand guide only. It is not possible with a pyrometer to continuously measure the temperature course of the surface, for instance, from the exit of the strand out of the mould as far as to the torch-cutting roller table. Such a continuous measuring is of a great significance, since thereby a faultless adjustment of the cooling of the strand in accordance with an optimal temperature course of the strand surface over the length of the plant is made possible.

It is known from German Offenlegungsschrift No. 26 57 068 to measure the surface temperature of the strand by means of a thermoelement applied onto the strand surface during the extraction of the strand from the mould, wherein the thermoelement, i.e., the measuring junction and the thermocouple connecting the measuring junction with the equalizing conduits, is applied onto the strand surface transversely to the longitudinal direction of the strand. This has the disadvantage that the point of connection of the thermoelement has to be within the cooling chamber, a short circuit due to humidity thus being possible. Moreover, it is necessary with the known method to move the connection point of the thermoelement synchronously with the strand, which requires a complex and expensive construction and involves the danger of this construction being damaged in the event of a strand breakthrough. In addition, the space laterally of the strand is rather limited.

SUMMARY OF THE INVENTION

The invention aims at avoiding these disadvantages and difficulties of the known measuring methods and has as its object to provide a measuring method that works continuously over the length of the strand and the length of the strand guide, as well as an arrangement for carrying out the method, which are not only insensitive to the conditions prevailing within the cooling chamber, but which also make possible to maintain the space laterally of the strand free, the arrangement for carrying out the method being designable in a structurally simple manner.

This object is achieved according to the invention in that the thermoelement is rolled into the strand surface in the longitudinal direction of the strand.

Suitably, several measuring junctions are subsequently rolled into the strand surface, the thermocouples of each measuring junction thus coming to lie one adjacent the other in the longitudinal direction of the strand.

An arrangement for carrying out the measuring method, comprising a strand guideway including strand guiding rollers and following upon a continuous casting mould, is characterized in that a stationary supplying means guiding a thermoelement between two neighbouring strand guiding rollers of a strand guideway is provided, which supplying means comprises a connection point for the connection with equalizing conduits of the thermoelement, wherein the supplying means suitably is provided with a drum coiling off the thermoelement and a tubular guideway extending from the drum to between two strand guiding rollers.

The temperature of a reference site must be known and constant when measuring the temperature of a strand as in the present invention. However, because the temperature of the connectors of the thermocouple only rarely is sufficiently constant to enable accurate measurement, the element is elongated by the above mentioned equalizing conduit to a location of uniform temperature. Equalizing conduits of this type generally comprise two cable-like conductors.

BRIEF DESCRIPTION OF THE DRAWINGS

The invention will now be explained in more detail by way of one embodiment and with reference to the accompanying drawing, wherein.

DETAILED DESCRIPTION OF EXEMPLARY EMBODIMENT

Figure 1:
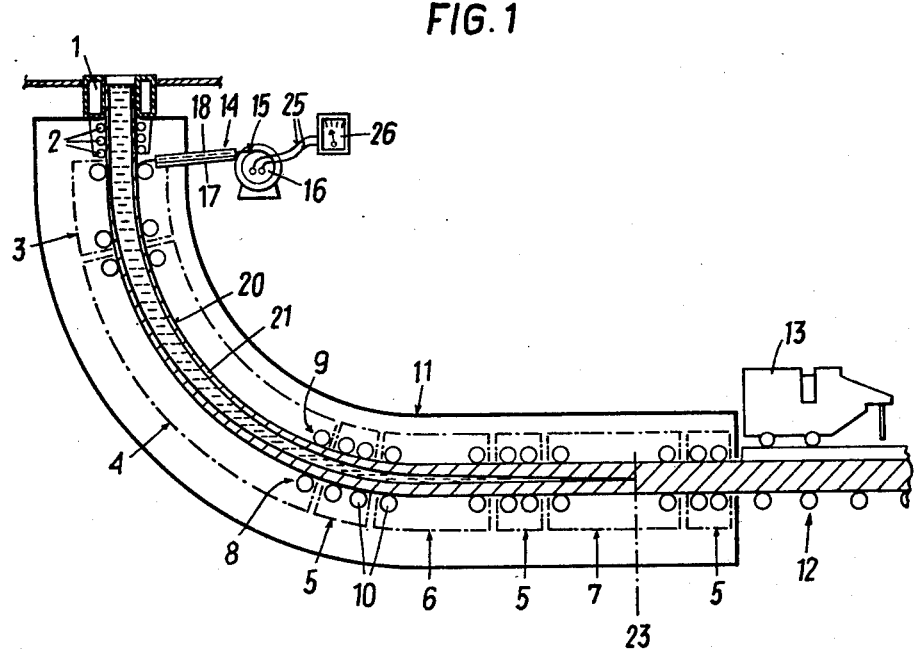
FIG. 1 is a schematic longitudinal section through a continuous casting plant incorporating the present invention.
Figure 2:
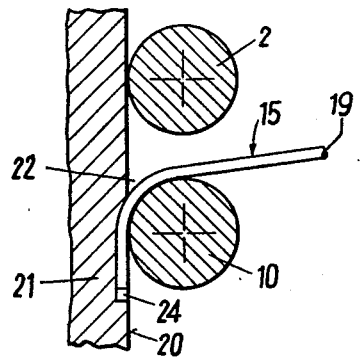
FIG. 2 is a detail of the invention as illustrated in FIG. 1.

Below a mould 1, there are supporting rollers 2 (foot rollers) fastened to it. Following upon these supporting rollers 2, a bending zone 3 is provided, upon which a circularly-arc-shaped one-part supporting and guiding structure 4 follows. In further sequence, a driving roller stand 5 and then a straightening aggregate 6 with a further driving roller stand 5 following, and a horizontal strand guide 7 following thereafter, are provided. Both the supporting and guiding structure 4 and the driving roller stands 5, as well as the straightening aggregate 6 and the horizontal strand guide 7, comprise oppositely arranged strand guideways 8, 9 provided with strand guiding rollers 10. For cooling the strand and the machine parts that come into contact with the strand, cooling nozzles (not illustrated) are provided, through which a coolant is sprayed over these machine parts and onto the strand surface. In order to prevent the steam and the spraying water from entering the casting hall, the entire strand guide is surrounded by a cooling chamber 11. Subsequent to the cooling chamber a torch-cutting roller-table 12 is provided, at which the strand is sheared into slabs of predetermined lengths by means of a torch cutter 13.

A stationary supplying means 14 for a thermoelement 15 is provided below the mould, which supplying means comprises a drum 16 provided with a drive, from which drum 16 a guideway 17 departs. The guideway 17 extends to between two strand guiding rollers, i.e., to between the last foot roller 2 mounted to the mould and the first strand guiding roller 10 of the bending zone 3. This guideway is provided with a tube 18 on its upper side.

The thermoelement 15 (preferably including a thermocouple 19 comprised of Ni/Cr-Ni) is coiled onto the drum 16 prior to the measuring of the temperature of the strand, and is threaded into the tube 18 by driving the drum 16. The thermoelement 15 and the drum 16 may be conductively coupled by slip rings or the like is pushed through the tube 18 in the direction towards the strand surface 20 of the strand 21, thus entering the gap 22 formed by the strand guiding roller 10 and the strand surface 20. Thereafter, the thermoelement is rolled into the strand surface 20 by means of the strand guiding roller 10. It will be appreciated by those skilled in the art in this connection that as the strand emerges from the mould 1 it has a solidified (although still somewhat soft or pliable) skin or shell which contains within it molten metal. It is this soft strand shell into which the thermoelement is rolled (and not into the molten part of the strand). The strand skin is not penetrated through to the molten metal by the thermoelement. The thermoelement 15, in terms of its length, corresponds approximately to the metallurgical length of the strand, i.e., to the length of the strand from the mould 1 to the first solidified cross section (at 23) of the strand 21 plus the length of the guideway 17. The thermoelement 15 includes at the front end of the thermocoupled 19 a measuring junction 24; at the rear end of the thermocouple 19 equalizing conduits 25 are connected via an automatic coupling unit (including plug-type connections to the coil drum 16), leading to a recording device 26, by which the temperature measured is indicated, scribed, or input into a computer for a selective control of the amounts of cooling water. By the thermoelement 15 rolled into the strand, the temperature prevailing at the strand surface 20 can be recorded over the total metallurgical length (if desired, as far as to the torch-cutting machine 13) both at the arc-inner-side and at the arc-outer-side surfaces 20. It is thus possible to determine exactly a re-heating of the strand surface 20, and to control precisely the amounts of cooling water in relation to the metallurgical length as well as the distribution of the amounts of cooling water onto the arc-inner-side and arc-outer-side surfaces 20 of the strand 21. In combination with a process calculator, an optimal control of the secondary cooling zone within the cooling chamber 11 can be achieved by this temperature measuring method.

The measuring process suitably is carried out at the onset of casting, the cooling being adjusted accordingly. But it is also possible to supply several thermoelements 15 to the strand 21 simultaneously, the measuring junctions 24 of the same being in the strand surface at a distance of about a few meters from one another (in the longitudinal direction of the strand 21 one after the other). The thermocouples 19 of the thermoelements simultaneously rolled into the strand surface are then parallel to one another.

Since the thermoelement comprises only very thin wires, it has but a slight effect on the surface quality of the strand. If the slabs are flame-scarfed by machine, the thermoelement will be completely removed from the strand surface, otherwise (with manual flame-scarfing), it must be flame-scarfed separately, if necessary.

What we claim is:

1. In a method of continuously measuring the temperature of the surface of a moving continuously cast strand over its length while the strand is solidifying, in particular a cast strand for steel slabs, in a continuous casting plant including a roller guide, at least one thermoelement having a measuring junction of a thermocouple, conductor means in equalizing conduit means that comprise reference junction means being connected with said measuring junction, which method comprises applying said thermoelement with its measuring junction and thermocouple onto said surface of said strand and moving said thermoelement together with said surface of said strand, the improvement which is characterized in that the measuring junction of said thermoelement is rolled into and substantially flush with said surface of said strand in the longitudinal direction of said strand.

2. A method as set forth in claim 1, wherein several thermoelements are used and wherein several measuring junctions subsequently are rolled into said surface of said strand, said thermocouples of each of said several measuring junctions coming to lie adjacent one another in the longitudinal direction of said strand.

3. In an arrangement for continuously measuring the temperature of the surface of a moving continuously cast strand over its length while the strand is solidifying, in particular a cast strand for steel slabs, to be used in a continuous casting plant of the type including a continuous casting mould, strand guideways following upon said mould and having strand guiding rollers, the improvement which comprises a stationary supplying means, at least one thermoelement having a measuring junction of a thermocouple and being guided between two neighbouring strand guiding rollers of a strand guideway by said stationary supplying means, conductor means in equalizing conduit means that comprise reference junction means connected with said measuring junction by said thermocouple, and a connection point provided on said stationary supplying means for establishing a connection with said equalizing means conduit.

4. An arrangement as set forth in claim 3, further comprising a drum provided on said stationary supplying means and adapted for coiling off said thermoelement, and a tubular guideway extending from said drum to between two strand guiding rollers.

* * * * *

UNITED STATES PATENT AND TRADEMARK OFFICE
CERTIFICATE OF CORRECTION

PATENT NO. : 4,411,534

DATED : Oct. 25, 1983

INVENTOR(S) : Kriegner et al.

It is certified that error appears in the above—identified patent and that said Letters Patent is hereby corrected as shown below:

Col. 3, line 14, after "mould" insert --1--;

line 27, after "like" insert -- . The thermoelement 15--.

Col. 4, lines 59-60, "means conduit" should read --conduit means--.

Signed and Sealed this

Seventeenth Day of January 1984

[SEAL]

Attest:

Attesting Officer

GERALD J. MOSSINGHOFF

Commissioner of Patents and Trademarks